2 Sheets—Sheet 1.

J. B. GRACEY.
Agricultural Implement.

No. 230,414. Patented July 27, 1880.

Attest.
J. M. Long.
W. T. Henson.

James B. Gracey,
Inventor.
By H. J. Abbot,
Atty.

J. B. GRACEY.
Agricultural Implement.
No. 230,414. Patented July 27, 1880.
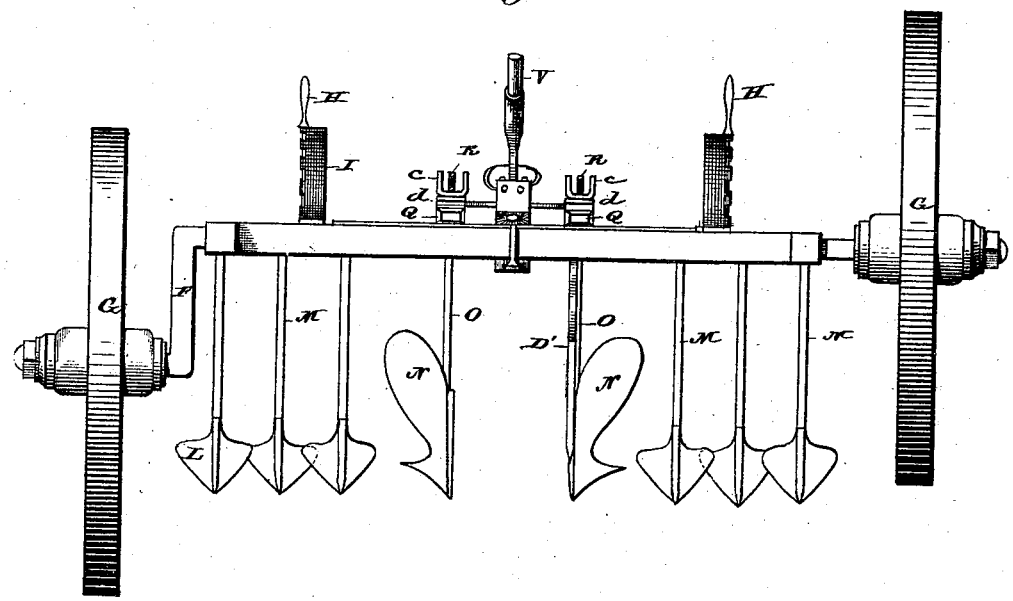
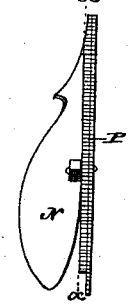
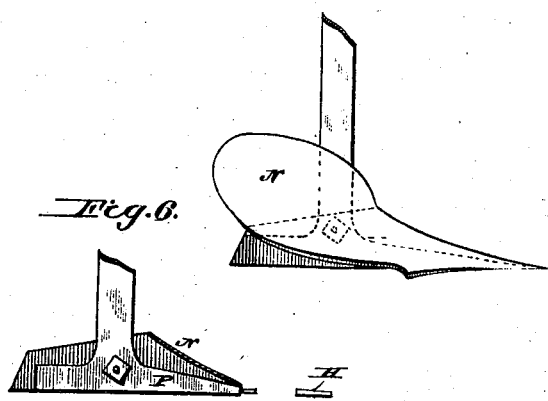

UNITED STATES PATENT OFFICE.

JAMES B. GRACEY, OF RICHMOND, VIRGINIA.

AGRICULTURAL IMPLEMENT.

SPECIFICATION forming part of Letters Patent No. 230,414, dated July 27, 1880.

Application filed December 31, 1879.

*To all whom it may concern:*

Be it known that I, JAMES B. GRACEY, of Richmond, in the county of Henrico and State of Virginia, have invented certain new and useful Improvements in Agricultural Implements; and I do hereby declare that the following is a full, clear, and exact description of the invention, which will enable others skilled in the art to which it appertains to make and use the same, reference being had to the accompanying drawings, and to the letters of reference marked thereon, which form a part of this specification, and in which—

Figure 1:
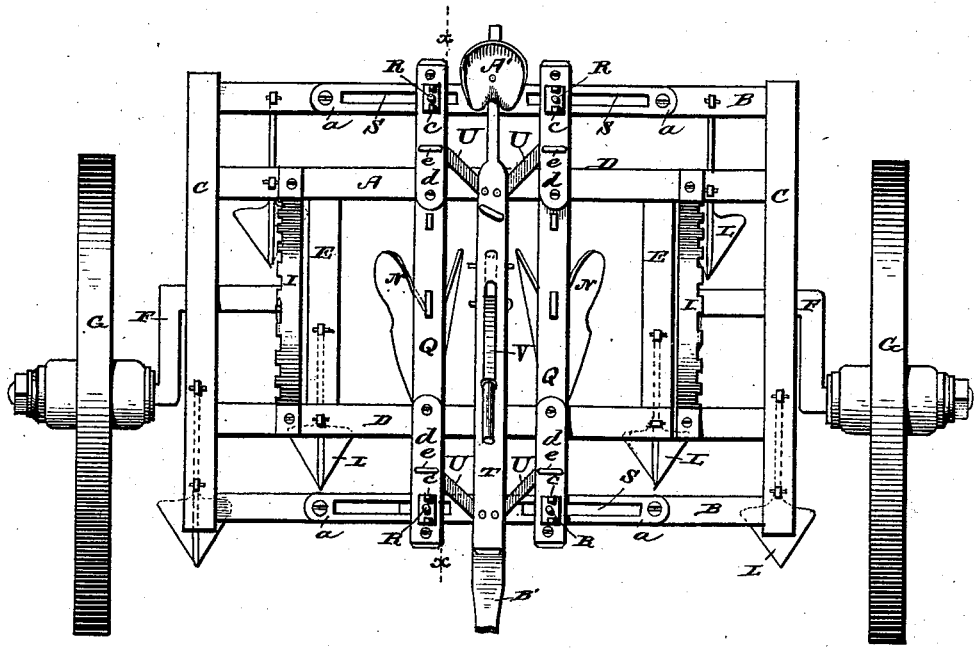
Figure 2:
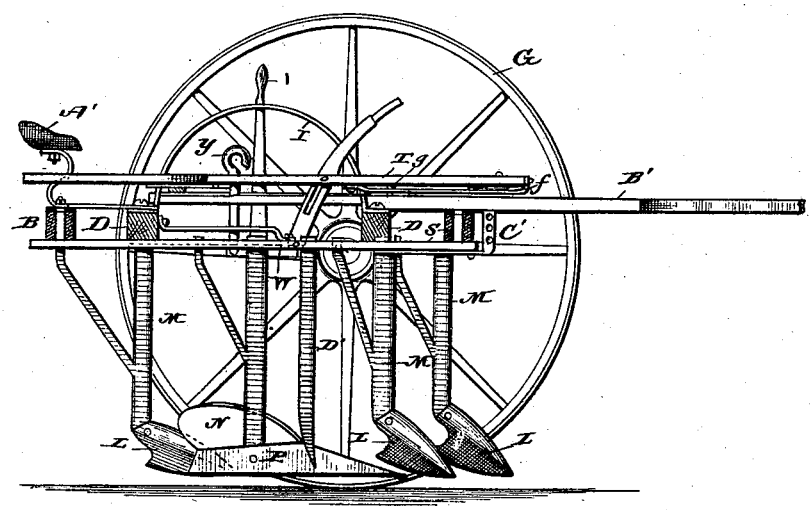

Figure 1 is a plan view; Fig. 2, a section through $x$ $x$ of Fig. 1; Fig. 3, a front view with one wheel lowered; Fig. 4, a side view of the plow and its standard; Fig. 5, a bottom view thereof; and Fig. 6, a vertical section through $x$ $x$ of Fig. 5.

My invention relates to combined plows and cultivators, used generally in the cultivation of drilled crops, such as corn, potatoes, cabbage, sugar-cane, cotton-seed, &c.; and it consists in the construction, as well as in the combination of parts, hereinafter particularly specified.

In the accompanying drawings, the letter A represents the frame of the machine, composed of longitudinal and cross bars B C, within which and secured thereto are cross-bars D and longitudinal bars E, the latter being located back from the ends of bars D toward the center of the frame. This frame is supported on the crank-axles F, which are journaled in the bars C E, as shown in Fig. 1, and have the wheels G journaled thereon. To these axles, between bars C E, there are fastened levers H, which extend upward and fit into notches formed on the sides of the quadrants I.

The levers are usually of metal, and admit of being sprung in and out of the notches, so that the axle may be turned when the lever is free from the notches and be held stationary when engaged therewith.

When it is desired to turn the axle, in order that both or either wheel may be elevated above or lowered beneath the plane of the frame for the purpose of elevating or lowering the teeth or plows, or for preserving the horizontal position of the frame of the machine in passing over uneven ground, the lever is pushed outward in the direction of the wheel, whereby it is freed from the quadrant, and when the desired elevation is reached the lever is released, and it then springs back and again enters one of the notches in the quadrant, holding the axle or wheel in the desired plane.

Fig. 3 of the drawings represents the wheels in different planes.

The cultivator-teeth L are secured to the standards M, the upper ends of which are passed through the bars E and C, and thereto securely held by means of nuts screwed onto the ends thereof, or by pins or bolts passed through holes therein.

The plows N are secured to standards O, each of which has an extension or bar, P, at its lower end, to which the landside is bolted.

The mold-board, landside, share, and point are all made in one piece, being drop-pressed of one piece of sheet-steel of the requisite strength and thickness; but the point may be made separate from the other parts, in which event the bar P is extended forward of the share and the point H' is fitted thereover, being made with a hole therein running from the rear toward the front, so as to form a socket, all as shown in Fig. 6 of the drawings; and when it is to be removed for the purpose of shaping it is struck on its shank or rear end until worked off the bar P.

The upper ends of the standards O are secured to the beams Q in the same manner that the cultivator-standards are secured to bars C and E. These beams are connected to the front and rear bars B by means of pins R, which are threaded at one end and formed with a head at the other. The heads of the pins fit into slots S cut in both front and rear bars B, and are prevented from being pulled upward out of the slots by means of slotted plates $a$, which are bolted or otherwise secured to the top of bars B, the width of the slots in said plates being narrower than the slots in the beams, so that the heads of the pins will strike against and be thereby prevented from being lifted out of the slots. These pins are passed up through holes formed in the ends of the beams, and are securely held thereto by means of thumb-nuts $c$ screwed onto the threaded ends. The beams can be removed from the frame by unscrewing nuts $c$ and withdrawing the pins from the slots through the under side thereof.

The purpose of so connecting the said parts is to prevent the beams from moving in the direction of their length while they are being adjusted laterally. These beams are connected at both ends to a central bar, T, by means of arms U, which form toggle-joints, so that when bar T is moved backward or forward the beams and their plows are brought nearer together or farther apart, as desired, thus accommodating said plows to the distance apart of the plants to be cultivated.

The arms U have a series of holes formed in them, and are pivoted at one end to bar T, while the other end is fitted between beams Q and plates $d$ secured to the top thereof. The plates are provided with one or more holes, in order that a pin, $e$, may be passed through them into the holes formed in the arms, so as to hold the arms between the beam and plate. The object in providing the arms with a series of holes is to render them capable of being lengthened or shortened by shifting the holding-pin from one hole to another.

The bar T is moved either forward or backward by means of a lever, V, which is passed through a slot in the bar and fulcrumed in a rigid bar, W, screwed to the frame under said bar T. These two bars have a series of holes formed through them vertically, in order that a pin, Y, may be passed through both bars, so as to hold the top bar rigidly and prevent the plows from moving toward or from each other after they have been properly adjusted.

To the lower side of bar T, at its forward end, there is secured, by any suitable means, a plate provided with a longitudinal slot, $f$, through which and into the shaft, and, if necessary, into the cross-bar D, there is passed a headed bolt, $g$, the head being between said plate and bar T. The functions of bolt and slotted plate are to hold the forward end of the bar T down to its place, and to form a guide and brace for bar T in its longitudinal movement.

The seat is indicated by the letter A', and is secured to the rear of the frame in any suitable well-known way.

A section of the tongue is indicated by the letter B', and is bolted to the bars B D under longitudinal bar T, and to the under side thereof, and to the bar W there is secured a perforated angular iron, C', which will be called a "regulator," and is intended to regulate the draft of the machine.

The colters, which are placed in front of the plows N, are indicated by the letter D', and are secured to the plow-beams in the same manner that the plow-standards are.

I do not make a broad claim to axles which by being turned will elevate or lower the wheels journaled therein, nor do I make a claim to laterally-adjustable plow-beams; but, Having described my invention, what I claim is—

1. The slotted bars B B, with plates $a$, in combination with bar T, connected to both front and rear of beams Q by toggle-joints U, and operated by lever V, whereby both of said beams, throughout their length, can be moved to and fro in opposite lateral directions, for the purpose set forth.

2. The combination of beams Q, toggle joints or arms U, perforated sliding bar T, bar W, lever V, and pin Y, all as described.

3. The mold-board, share, and landside, made in one piece, and combined with standard O, provided with arm P, which extends along the landside to strengthen the same, and projects beyond the share, so that a socketed point, H', may be fitted thereto, substantially as set forth.

4. The longitudinal bar T, provided with slotted plate $f$, in combination with beams Q, provided with plate $d$, perforated arm U, and pins $e$, substantially as and for the purposes set forth.

5. The perforated arms U and pins $e$, in combination with longitudinal bar T and plate $f$, substantially as set forth.

In testimony that I claim the foregoing as my own I affix my signature in presence of two witnesses.

JAMES BOUCH GRACEY.

Witnesses:
F. E. THOLL,
F. HARBARTH.